United States Patent [19]
Chiou et al.

[11] Patent Number: 5,568,340
[45] Date of Patent: Oct. 22, 1996

[54] CASSETTE LOADING AND UNLOADING DEVICE

[75] Inventors: Yee-Haur Chiou, Hsinchu; Jyh-Jong Ju, Tauryuan, both of Taiwan

[73] Assignee: Industrial Technology Research Institute, Hsin Chu, Taiwan

[21] Appl. No.: 365,137

[22] Filed: Dec. 28, 1994

[51] Int. Cl.⁶ ................................................. G11B 5/008
[52] U.S. Cl. ............................................. 360/96.5; 360/95
[58] Field of Search .............................. 360/93, 95, 95.6, 360/96.6

[56] References Cited

U.S. PATENT DOCUMENTS

| | | | |
|---|---|---|---|
| 4,303,955 | 12/1981 | Kramer et al. | 360/93 |
| 5,032,940 | 7/1991 | Watanabe et al. | 360/96.5 |
| 5,272,579 | 12/1993 | Ohkubo et al. | 360/96.5 |
| 5,323,281 | 6/1994 | Park | 360/96.5 |

Primary Examiner—Stuart S. Levy
Assistant Examiner—William J. Klimowicz
Attorney, Agent, or Firm—Bacon & Thomas

[57] ABSTRACT

A front loading cassette tape latching, loading and unloading device comprises a base seat, a cassette sliding plate, cassette clamping arms, cassette damping rollers, a cassette spring plate, cassette guide seats, a button sliding plate and a button sliding plate agraffe. When the cassette tape is being pushed into the machine, it will move the cassette sliding plate and trigger the button sliding plate agraffe to force the button sliding plate out, and further allow the cassette clamping arms to rotate. Rotation of the clamping arms forces the cassette clamping rollers to clamp the cassette and to latch the cassette tape on the guide seat. When removing the cassette, the button sliding plate is pushed to open the clamping rollers, and the cassette will spring out of the machine by the force of the cassette sliding plate. This compact cassette loading and unloading arrangement is easy to assemble and cost effective to produce.

4 Claims, 13 Drawing Sheets

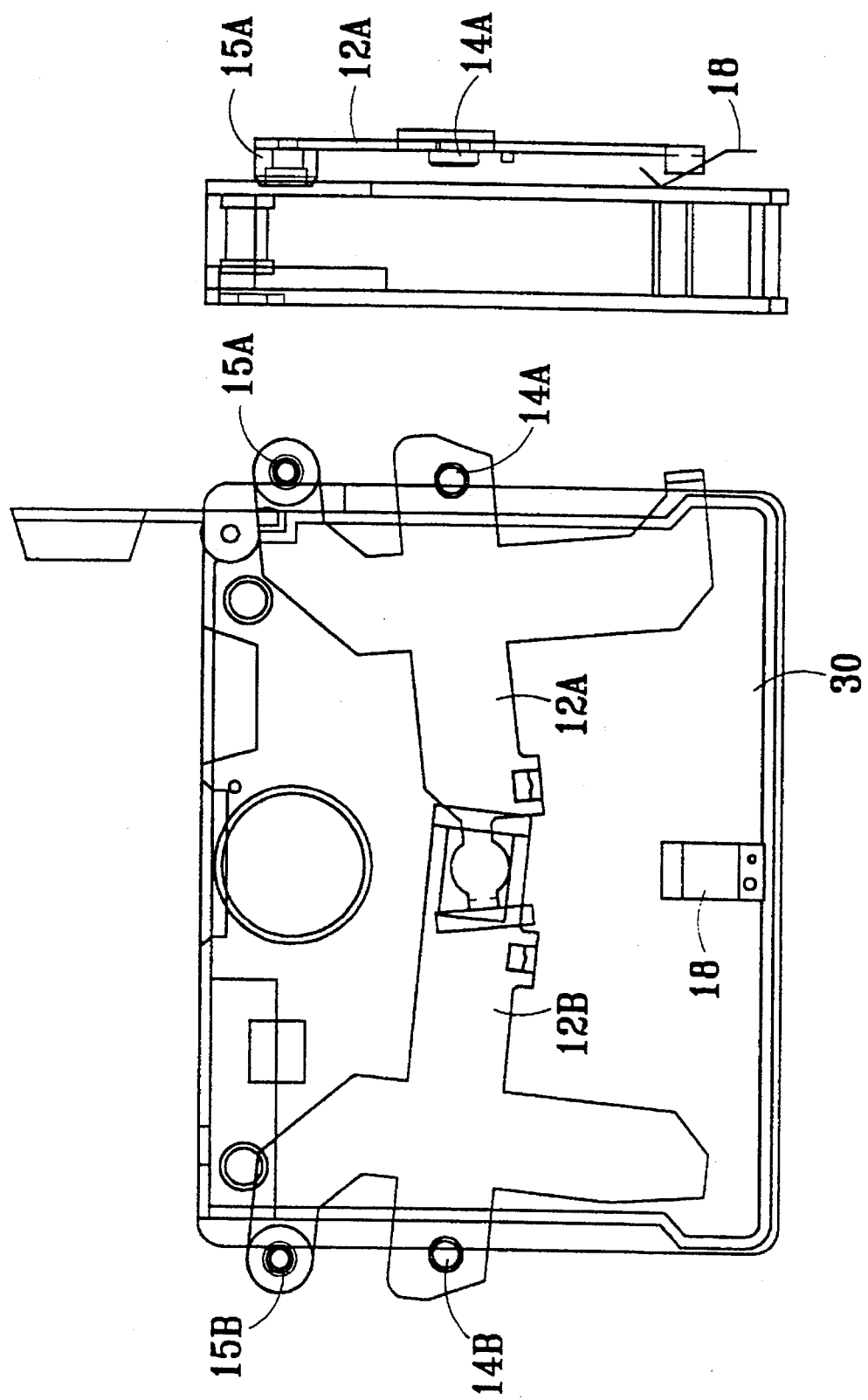

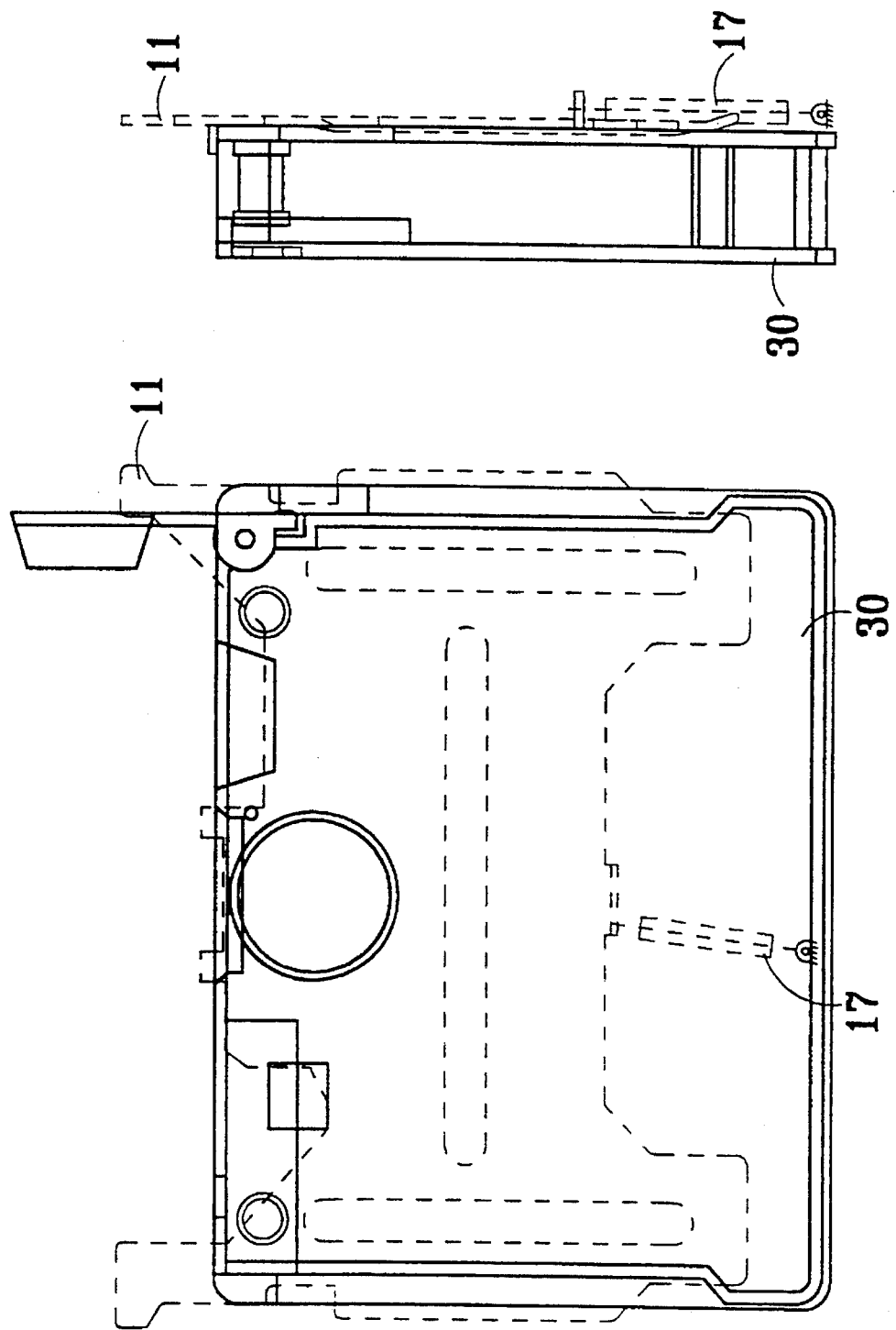

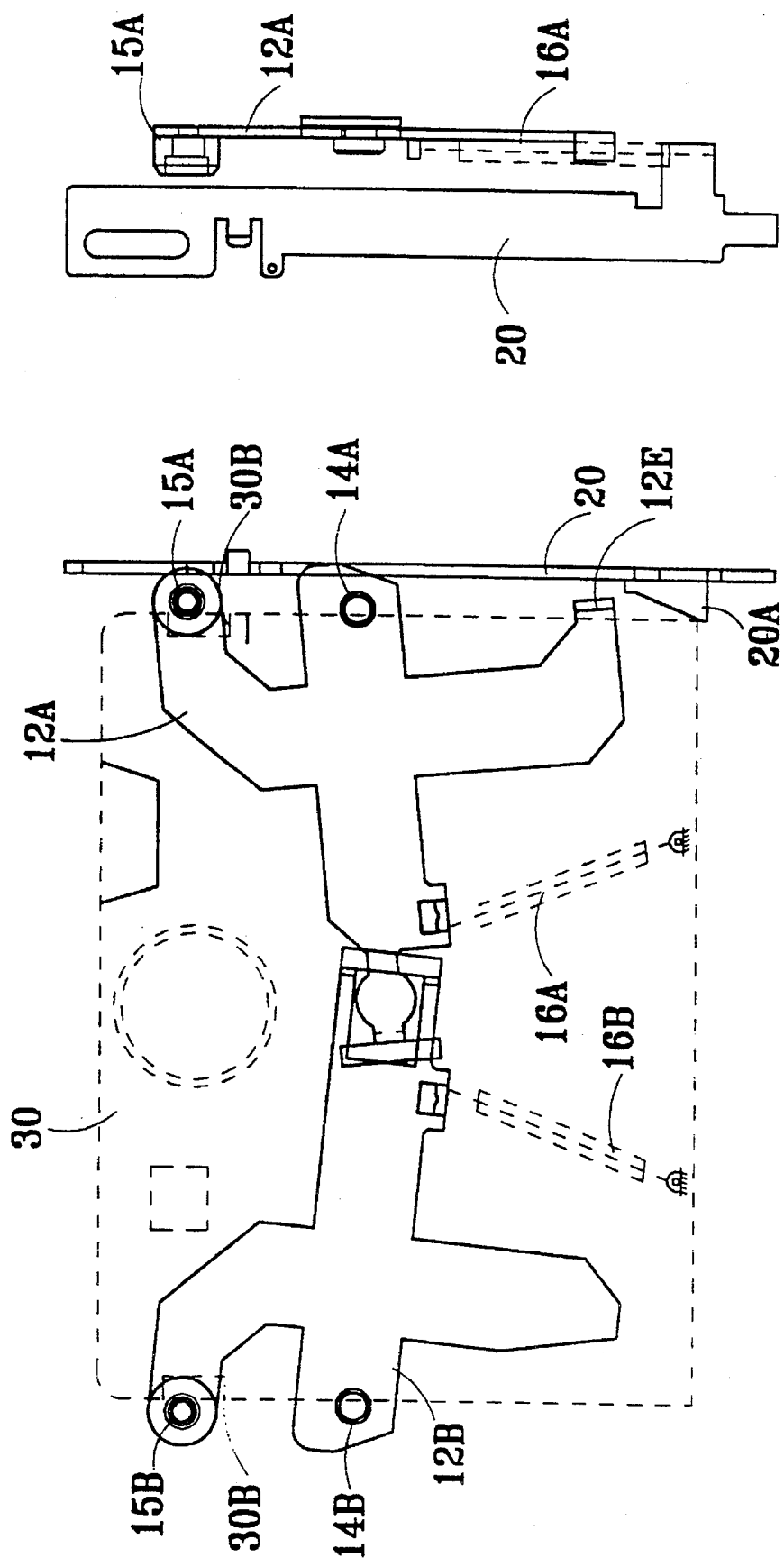

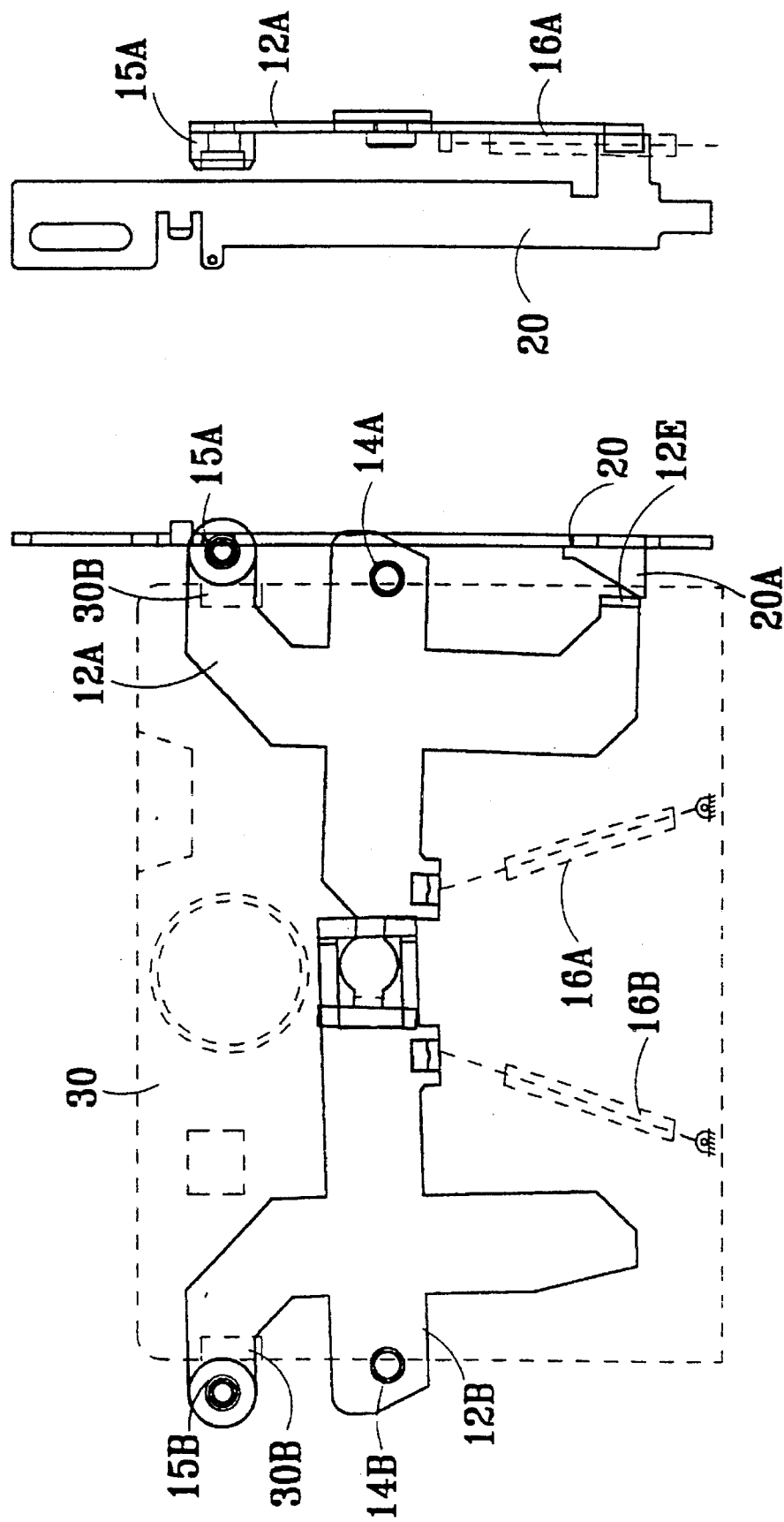

CASSETTE LOADING AND UNLOADING DEVICE

BACKGROUND OF THE INVENTION

1. Field of the Invention

The present invention relates to a front load cassette loading device, especially a device that is capable of latching, loading and unloading a cassette tape.

2. Description of the Prior Art

U.S. Pat. Nos. 4701867, 5084792 and 5237469 disclose known cassette loading and unloading mechanisms. Unlike the present invention, the '817 and '792 patents do not provide for a tape latching function which have been advantageously employed on average audio cassettes; and the '469 patent incorporates a motor drive for a latching device. These known arrangements fail to provide a tape latching, loading and unloading device which prevents tape wobbling in the cassette.

SUMMARY OF THE INVENTION

The purpose of the present invention is to offer a push keyed cassette tape latching, loading and unloading device that can work swiftly and accurately.

Another purpose of the present invention is to offer a simple structured cassette tape latching, loading and unloading device that is easy to assemble and disassemble.

Still, another purpose of the present invention is to offer a cassette tape latching, loading and unloading device that may accurately latch the tape, is compact and appropriate for use with compact cassette machines.

BRIEF DESCRIPTION OF THE DRAWINGS

The drawings illustrate a preferred embodiment of the invention which serves to exemplify the various advantages and objects hereof, and are as follows:

FIG. 9A is a bottom view of the right and left clamp arms clamping a cassette tape in accordance with the present invention;

FIG. 9B is a right side view of the right and left clamp arms clamping the cassette tape of the present invention;

FIG. 10A is a top view of the cassette slide plate with the cassette in accordance with the present invention;

FIG. 10B is a front view of the cassette slide plate with the cassette;

FIG. 11A is a bottom view of the present invention showing the relationship between the button plate and the cassette being clamped by the clamping arms;

FIG. 11B is a right side view of the present invention showing the relationship between the button plate and the cassette being clamped by the clamping arms;

FIG. 12A is a bottom view of the present invention showing the relationship between the button plate and the cassette being opened by the clamping arms;

FIG. 12B is a right side view of the present invention showing the relationship between the button plate and the cassette being opened by the clamping arms;

DETAILED DESCRIPTION OF THE PREFERRED EMBODIMENT

Referring to FIGS. 1 to 4 and FIGS. 9A and 9B, the cassette 30 being clamped by the cassette machine mainly comprises 3 components: a right clamping roller 15A, a left clamping roller 15B and a cassette clamping spring 18 used to clamp and latch the cassette 30 onto the machine to prevent the cassette from shaking when the machine is reading the magnetic tape. The left and right clamp rollers 15B, 15A apply upward, forward and inward pressure upon the cassette 30, and push the cassette 30 tightly against the base of a cassette sliding plate 11 and further latch the cassette tape. The middle cassette clamping spring 18 is provided to enhance the upward pressure when the cassette tape is being placed into the machine. As shown in FIGS. 9A and 9B, the clamping spring 18 is a V-shaped spring board, and the left and right clamping rollers 15B, 15A are each provided with a cone-shaped roller portion on top, wherein the clamping pressure is produced by the cone-shaped portion of the roller tightly leaning against the cassette 30 and is related to the angular shape of the roller portion.

Figure 6:
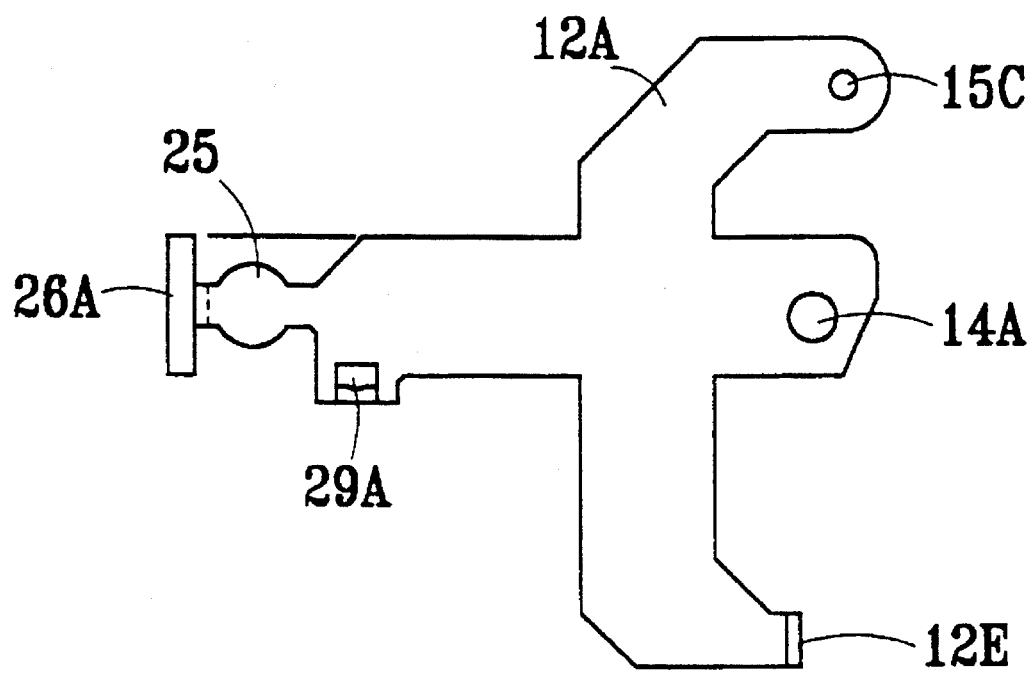
FIG. 6A is a top view of the right clamp arm of the present invention.
FIG. 6B is a front view of the right clamp arm of the present invention.
Figure 6:
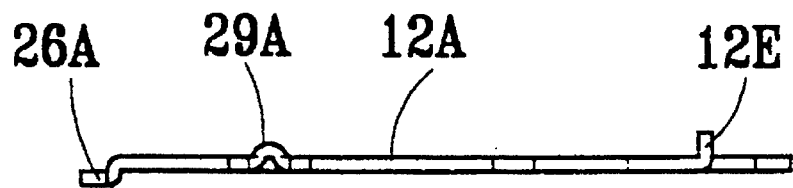
Figure 7:
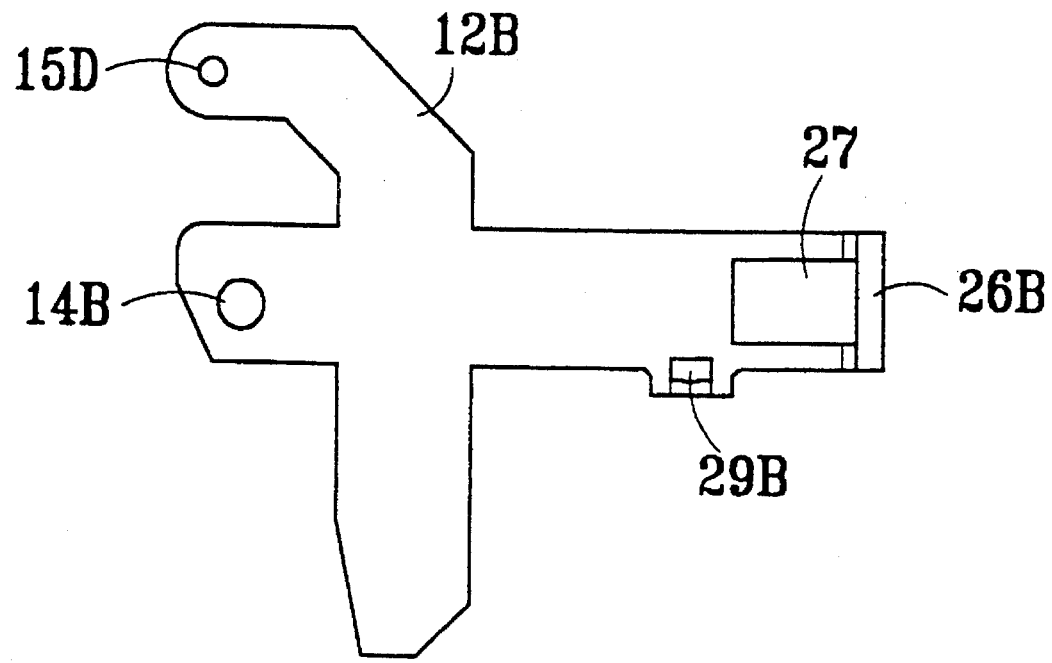
FIG. 7A is a top view of the left clamp arm of the present invention.
FIG. 7B is a front view of the left clamp arm of the present invention.
Figure 7:
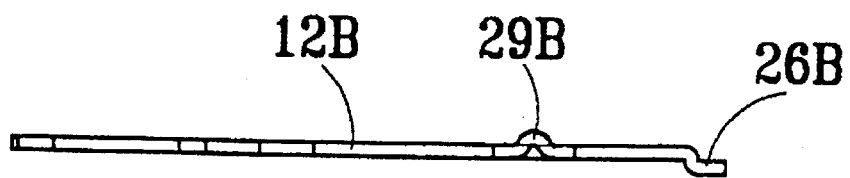

As shown in FIGS. 1, 6A, 6B, 7, 9A and 9B, the left and right clamping arms 12B, 12A are placed on the base 10, wherein said base 10 is shaped as a rectangular, slotted frame with various spaced assembly holes on the bottom thereof to station all components. Left and right arm axles 14B, 14A are used to rotatably mount clamping arms 12B, 12A on base 10, and the two clamping arms 12B, 12A include connecting structure adapted to engage the middle portion of the cassette 30 to transmit pressure thereto. As shown in FIG. 6A, the right clamping arm 12A is generally shaped like a cross, the top and bottom ends extending to the right side, the top end being connected between the right clamping roller axle 15C and the right clamping roller 15A, and the right end is connected by the right clamping arm roller axle 14A to the base plate 10. The left end is shaped as a round end 25 and terminates in a slender piece 26A, and the left end arm has a right spring stationed seat 29A including a small stud for connection with one end of the clamping arm spring 16A. As shown in FIGS. 7A and 7B, the left clamping arm 12B is also generally shaped like a cross with a top end which extends leftward and is connected between the left clamping roller axle 15D and left clamping roller 15B. The left end of left clamping arm 12B is connected by the left clamping arm axle 14B to the base plate 10. The right end is formed with a hollow square slot 27 which is defined in part by a terminal slender piece 26B. Within the right arm, a left spring stationed seat 29B is formed which is shaped the same as the right spring stationed seat 29A and is adapted to be connected to one end of the clamping arm spring 16B. When assembled, the round end 25 is plugged into the square slot of the square end 27 (see FIG. 9A). More specifically, the right slender piece 26A and the round end 25 are plugged into the square slot 27, the round end 25 is connected in the square slot 27, and the right slender piece 26A is thus located at the right underside of the left clamping arm 12B. Thus, the two slender pieces 26A, 26B act against each other to prevent the two clamping arms 12A and 12B from moving up and down.

Figure 8:
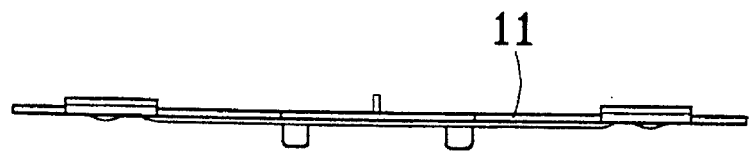
FIG. 8A is a top view of the cassette slide plate of the present invention.
FIG. 8B is a left side view of the cassette slide plate of the present invention.
FIG. 8C is a rear view of the cassette slide plate of the present invention.
Figure 8:
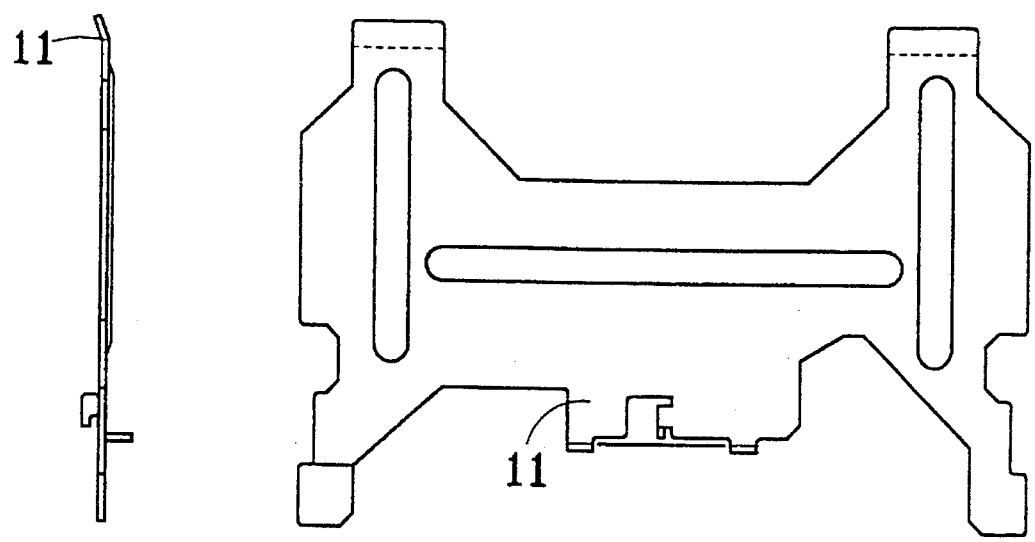
Figures 13A, 13B:
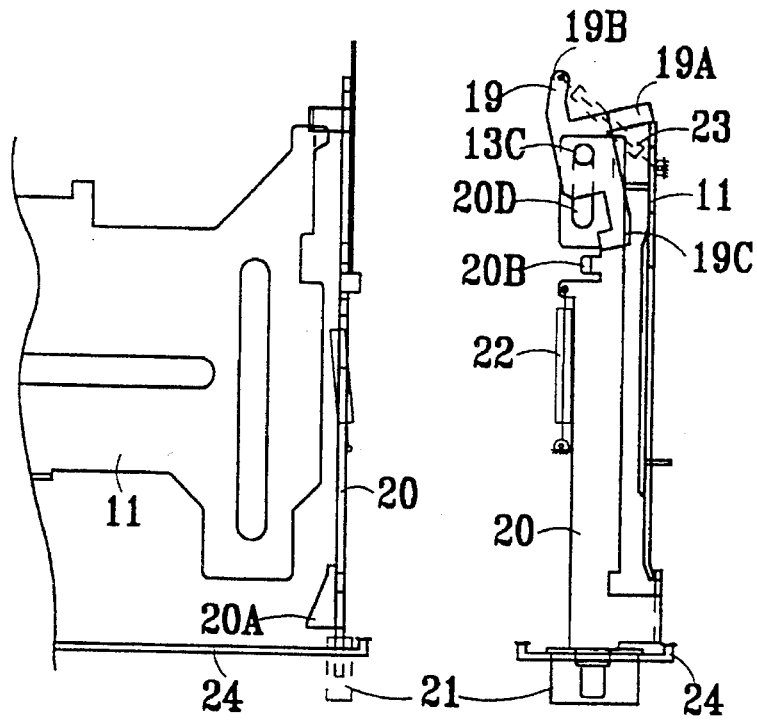
FIG. 13A is a top view of the present invention showing the agraffe of the button plate being disengaged when the cassette slide plate and button are in certain positions.
FIG. 13B is a right side view of the present invention showing the agraffe of the button plate being disengaged when the cassette slide plate and the button are in certain positions.
Figures 14A, 14B:
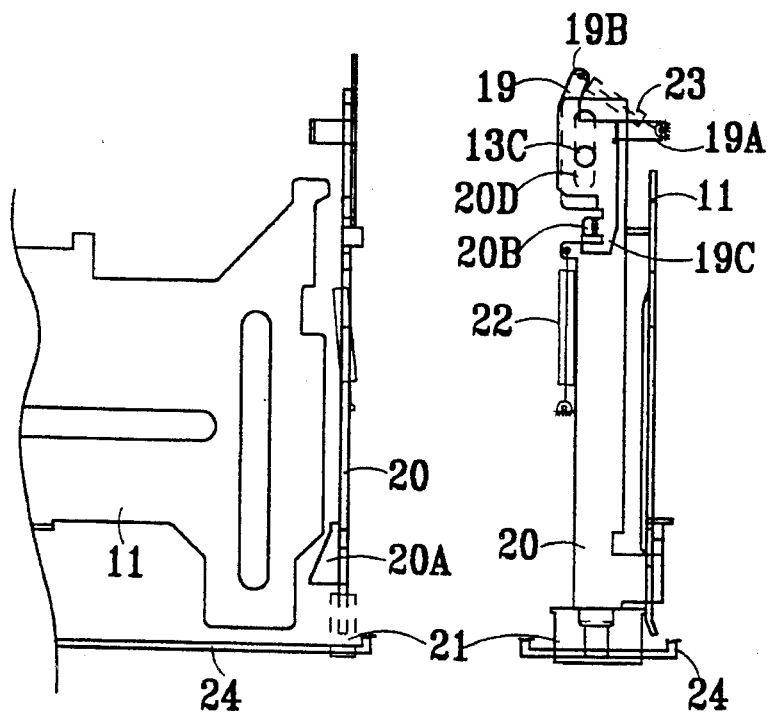
FIG. 14A is a top view of the present invention showing the agraffe of the button plate being disengaged when the cassette slide plate and the button plate are sprung out.
FIG. 14B is a right side view of the present invention showing the agraffe of the button plate being disengaged when the cassette sliding plate and the button plate are sprung out.
Figure 15:
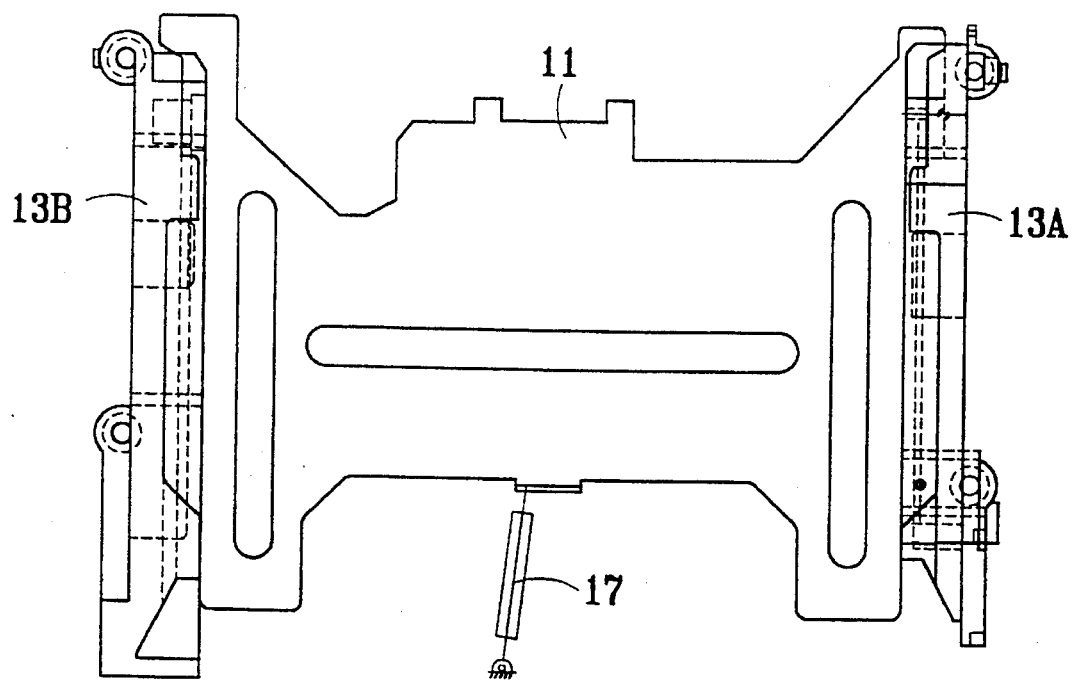
FIG. 15A is a top view of the cassette slide plate and the guide seat in a matching position.
FIG. 15B is a front view of the cassette slide plate and the guide seat.
Figure 15:
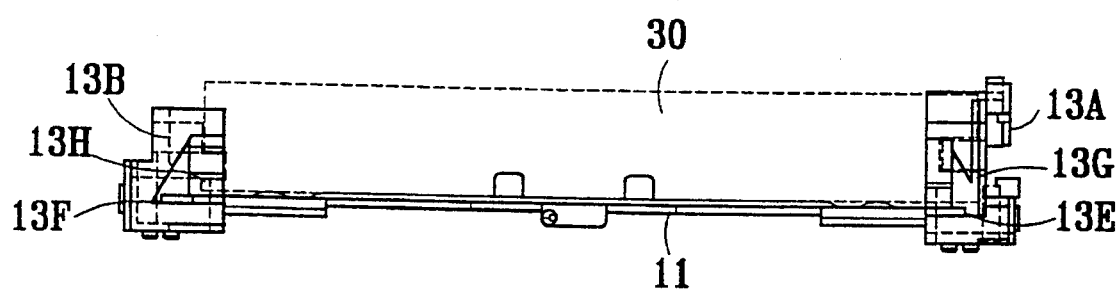

With reference to FIGS. 10A and 10B, as the cassette 30 is being pushed into the base plate 10, the cassette sliding plate 11 is moved along with cassette 30. Cassette sliding plate 11, shown in FIGS. 8A, 8B and 8C, is connected to a cassette spring 17 (again see FIGS. 10A and 10B). When the cassette 30 is pushed into the base plate 10, the cassette spring 17 will elongate, such that when the cassette needs to be removed, the cassette spring 17 will provide the needed force.

FIGS. 11A, 11B, 12A and 12B illustrate the relationship between the cassette 30 and the left, right clamping arms 12B, 12A. As the two clamping arms 12B, 12A engage the cassette 30, the rollers 15B, 15A on the clamping arms 12B, 12A will clamp the top corners of the generally inverted U-shaped grooves 30B provided on the left and right top corners of the cassette 30. As the cassette 30 is to be removed from the machine, the clamping arms 12B, 12A will coact with each other to extend outwards to free the cassette 30 from the rollers 15B, 15A and to force the cassette sliding plate 11 to spring away from the base plate 10 along with the cassette 30. The clamping arms 12B, 12A are equipped with cassette clamping arm springs 16A, 16B having tops positioned on the station seats 29A, 29B to offer tension pressure to clamp the cassette 30, whereas the other ends of the springs are attached to base plate 10.

Figure 1:
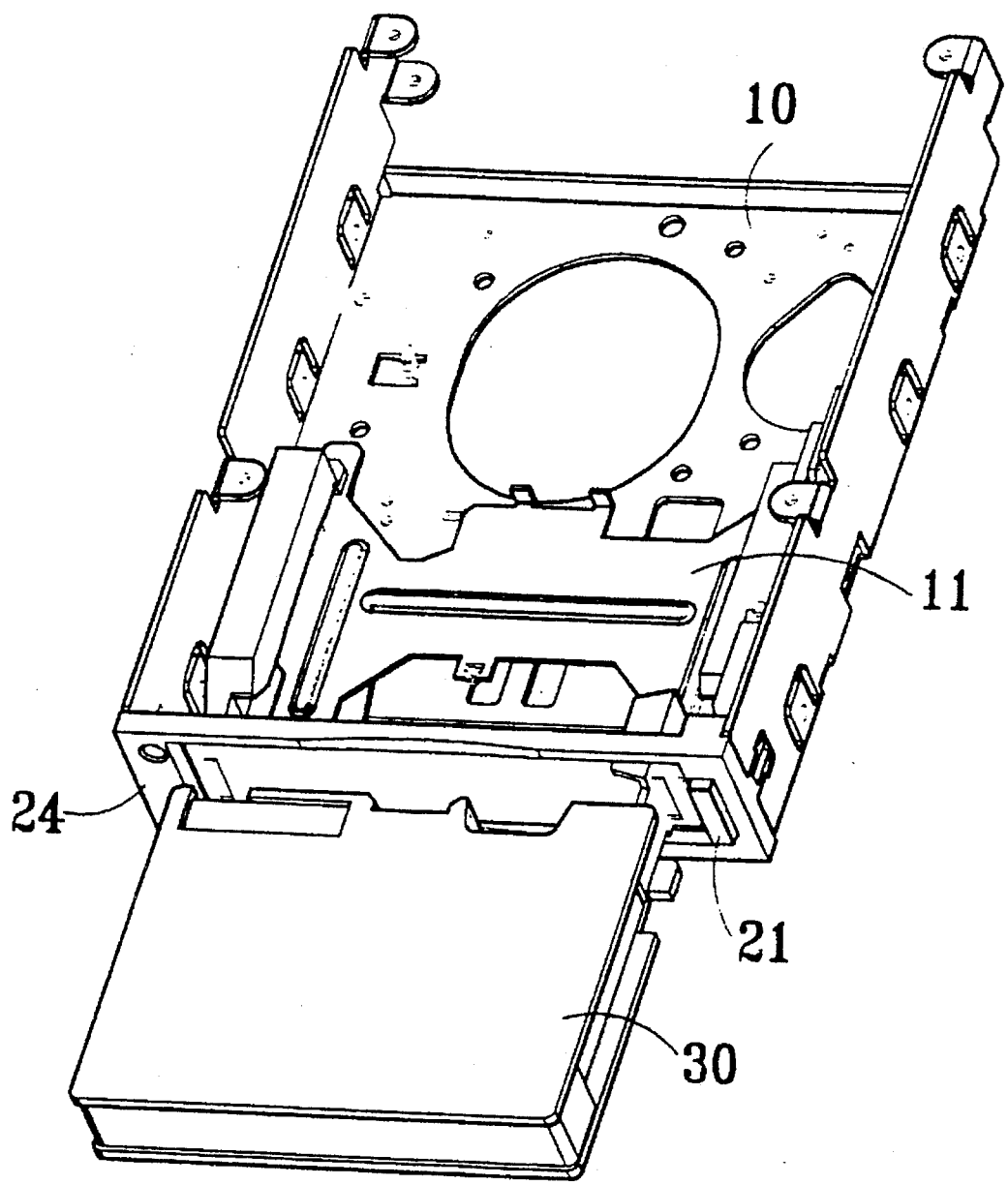
FIG. 1 is a perspective view of the present invention illustrating the cassette assembly component.
Figure 2C:
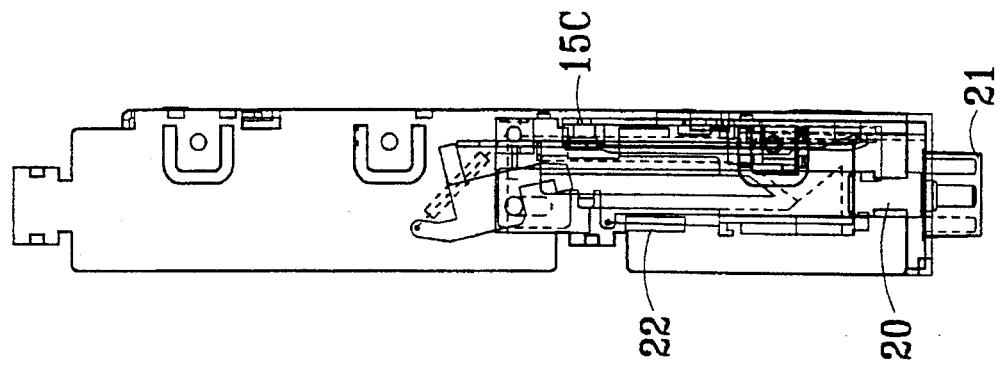
FIG. 2C is a left side view of the assembled cassette assembly of the present invention.
Figure 2A:
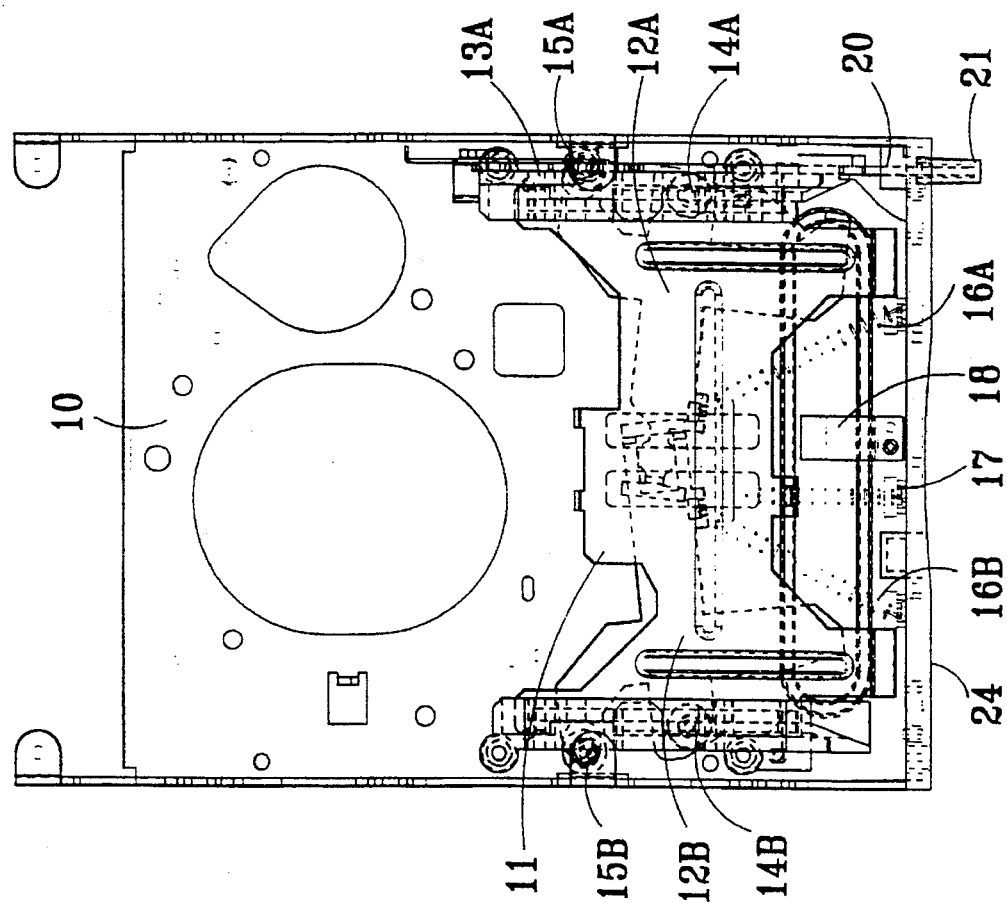
FIG. 2A is a top view of the assembled cassette assembly of the present invention.
Figure 2B:
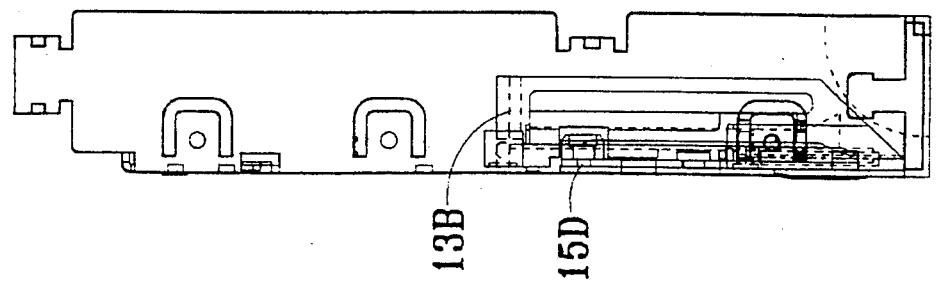
FIG. 2B is a right side view of the assembled cassette assembly of the present invention.
Figure 3:
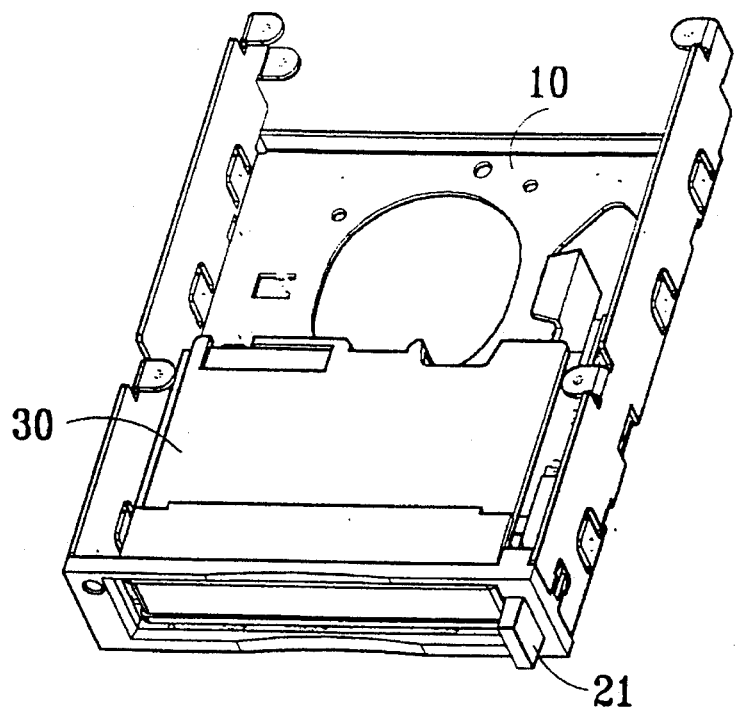
FIG. 3 is a perspective view of the present invention with the cassette tape in position.
Figure 4:
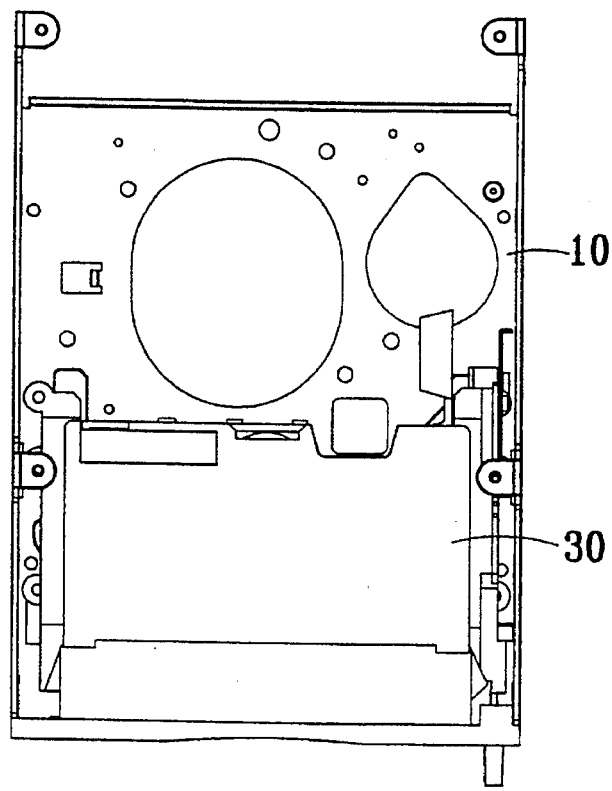
FIG. 4 is a top view of the present invention with the cassette tape in position.
Figure 5:
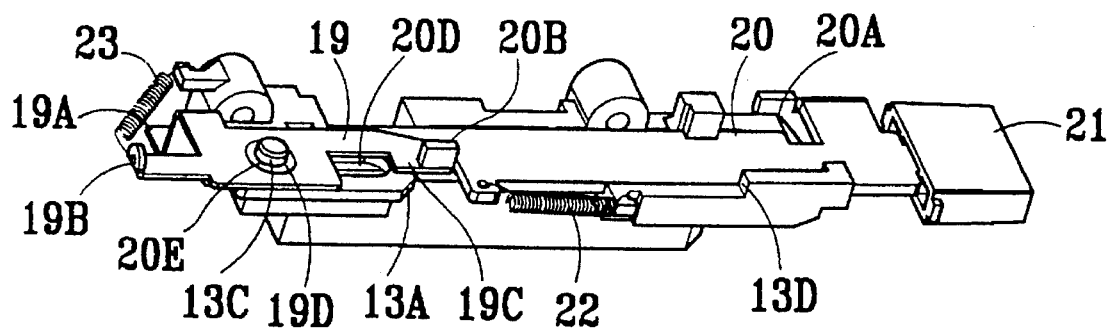
FIG. 5 is a perspective view of the button plate and guide seat assembly incorporated in the present invention.

The button plate 20 slides in the sliding slot 13D (see FIG. 5) on the right guide seat 13A, whereby opening of the left and right clamping arms 12B, 12A can be accomplished by pushing the button 21 and shifting button plate 20. Under the button plate 20, an "L" shaped bent sliding plate 20A functions to push a connecting surface 12E of the right clamping arm 12A which is under the right clamping arm 12A to make the right clamping arm 12A rotate clockwise, at the same time, the left clamping arm 12B will be forced to rotate counterclockwise due to the interconnection of the round end 25 and the square slot 27, thereby forcing the clamping arms 12B, 12A to open.

As shown in FIGS. 13 to 15 and FIG. 5, the left and right cassette guide seats 13B, 13A are positioned on the two sides of the base plate 10. On each guide seat 13A, 13B is formed slide slots 13G, 13H and sliding "U" slots 13E, 13F to guide the sliding components for the movement of the cassette. A button sliding plate agraffe 19 is provided with a shaft hole to allow the shaft 13C of the right guide seat 13A to penetrate through the button plate 20 and to come out of a rear oval hole 20D. A "C" buckle 20E is attached onto the shaft 13C. As the cassette 30 is being pushed into the base plate 10, the cassette sliding plate 11 will slide along the left and right guide seats 13B, 13A of FIGS. 15A and 15B and during the rearward sliding of the cassette sliding plate 11, the rotating arm 19A on the button sliding plate agraffe 19 will rotate the shaft 13C on the right guide seat 13A. The other rotating arm 19B of the button sliding plate agraffe 19 has attached thereto an agraffe return spring 23, and the other end of the agraffe return spring 23 is attached to the top rear side of the right guide seat 13A. The other end 19C of the button sliding plate agraffe 19 comprises an "upside-down U" shaped structure. As the cassette 30 is sprung out of the base plate 10, the other end 19C of the button sliding plate agraffe 19 will lock into the button sliding plate slot 20B and stop the button sliding plate 20 from moving outward.

On the other hand, the button 21 only protrudes from the surface board 24 a slight distance at this point. AS the cassette sliding plate 11 is being pushed into a latching position, the button sliding plate agraffe 19 is released. The button sliding plate 20 thus springs outward to make the button 21 protrude a greater distance from the surface board 24. To retrieve the cassette 30, the operator simply pushes the button 21 such that the button sliding plate 20 will move inward, and the sliding plate 20A will push the clamping arms 12A and 12B to rotate to release the cassette 30, thereby no longer clamping the cassette sliding plate 11 such that the cassette 30 is forced by cassette sliding plate 11 out of the base plate 10 to complete removal of the cassette 30. Furthermore, the rear protruding portion of the cassette sliding plate 11 will be stopped by the left and right rollers 15A 15B in order to prevent the cassette 30 from being sprung out too far.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

We claim:

1. A cassette loading and unloading device comprising:
 a base plate provided with a plurality of spaced connecting holes;
 a pair of laterally spaced cassette guide seats secured to said base plate at selected ones of said connecting holes, each of said guide seats defining a generally U-shaped guide slot;
 a sliding plate upon which a cassette is adapted to be positioned, said sliding plate including opposing lateral portions respectively slidably received in said guide seats, a rear portion including at least one upstanding member adapted to abut a cassette placed on said sliding plate and a front portion;

a spring interconnected between said base plate and the front portion of said sliding plate, said spring tending to bias said sliding plate forward relative to said base plate;

a pair of cassette clamping arms pivotally mounted, at laterally spaced positions, to said base plate, each of said clamping arms including a rear portion;

a pair of coned rollers each of which is rotatably mounted to the rear portion of a respective one of said clamping arms through a respective axle and adapted to engage and retain a cassette placed in said device;

a button sliding plate positioned on one of said pair of guide seats, said button sliding plate including a bent portion at a front end thereof adapted to engage and pivot one of said clamping arms, said button sliding plate further having a rear portion formed with an oval-shaped hole and a central portion formed with a slot;

means for interconnecting lateral inward portions of said pair of clamping arms such that pivoting of one of said clamping arms also causes the other of said clamping arms to pivot in unison;

a shaft attached to said one of said pair of guide seats and extending through the oval-shaped hole of said button sliding plate;

a button sliding agraffe including first, second and third arms extending from a central portion thereof, said central portion being provided with a hole that receives said shaft such that said button sliding agraffe is rotatable relative to said button sliding plate between a first, unloaded position and a second, loaded position, said first arm being adapted to be engaged by said sliding plate to rotate said button sliding agraffe to said second position when a cassette is loaded in said device, said third arm extending forwardly and including a portion adapted to extend within the slot formed in the central portion of said button sliding plate when said button sliding agraffe is rotated to said first position upon unloading a cassette from said device to limit forward movement of said button sliding plate; and a return spring interconnected between the second arm of said button sliding agraffe and said one of said pair of guide seats to bias said button sliding agraffe into said first position.

2. The device according to claim 1, further comprising a push button connected to the front end of said button sliding plate, said push button being adapted to be manually pushed to shift said button sliding plate relative to said guide seats to cause pivoting of said clamping arms by engagement of the bent portion of said button sliding plate with said one of said clamping arms and unloading of a cassette positioned in said device.

3. The device according to claim 1, further comprising a cassette clamping spring having a first end portion attached to said base plate and a second end portion which protrudes upwards from the base plate, said second end portion being adapted to upwardly bias a cassette loaded in said device to limit movement of the cassette within the device and to abut said sliding plate to limit movement thereof when a cassette is unloaded from said device.

4. The device according to claim 1, wherein each of said clamping arms is provided with a spring seat adjacent said interconnecting means, said device further comprising a pair of clamping springs each of which has one end located in a respective said spring seat and another end attached to said base plate, and wherein said interconnecting means comprises a square-shaped slot formed in the lateral inward portion of one of said pair of clamping arms and a spherical connector and a terminal plate formed in the lateral inward portion of the other of said pair of clamping arms, said spherical connector and terminal plate being positioned within said square-shaped slot.

* * * * *